United States Patent
Chai et al.

(10) Patent No.: US 10,318,331 B2
(45) Date of Patent: Jun. 11, 2019

(54) METHOD AND APPARATUS FOR LIVE-MIGRATING VIRTUAL MACHINES

(71) Applicant: BEIJING BAIDU NETCOM SCIENCE AND TECHNOLOGY CO., LTD., Beijing (CN)

(72) Inventors: Wen Chai, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 228 days.

(21) Appl. No.: 15/428,941

(22) Filed: Feb. 9, 2017

(65) Prior Publication Data

US 2018/0074840 A1   Mar. 15, 2018

(30) Foreign Application Priority Data

Sep. 9, 2016 (CN) .......................... 2016 1 0812046

(51) Int. Cl.
  *G06F 9/455*  (2018.01)
  *G06F 9/48*   (2006.01)
(52) U.S. Cl.
  CPC ........ *G06F 9/45558* (2013.01); *G06F 9/4862* (2013.01); *G06F 2009/4557* (2013.01)
(58) Field of Classification Search
  CPC ............... G06F 9/45558; G06F 9/4862; G06F 2009/4557
  See application file for complete search history.

(56) References Cited

U.S. PATENT DOCUMENTS

| 9,928,107 B1* | 3/2018 | Vincent ................. G06F 9/4856 |
| 2014/0095829 A1* | 4/2014 | Mo ..................... G06F 13/1668 |
| | | 712/31 |
| 2016/0299773 A1* | 10/2016 | Dong .................. G06F 9/45558 |

FOREIGN PATENT DOCUMENTS

| CN | 103617070 A | 3/2014 |
| CN | 104111867 A | 10/2014 |

OTHER PUBLICATIONS

"EVU and CPU Compatibility FAQ (1005764)," last updated Apr. 17, 2018, URL=https://kb.vmware.com/s/article/1005764, download date May 14, 2018, 5 pages.
(Continued)

*Primary Examiner* — Jacob D Dascomb
(74) *Attorney, Agent, or Firm* — Seed IP Law Group LLP

(57) ABSTRACT

An implementation of a method for live-migrating virtual machines includes: acquiring, when receiving a request for live-migrating a virtual machine to a target physical machine, CPU information of a source physical machine and CPU information of the target physical machine; determining whether a CPU instruction set architecture of the source physical machine is compatible with a CPU instruction set architecture of the target physical machine; determining whether CPU features of the source physical machine are compatible with CPU features of the target physical machine, if the two CPU instruction set architecture are compatible; determining whether incompatible CPU features between the source physical machine and the target physical machine are in a preset list, if the two CPU instruction set architecture are not compatible; and live-migrating the virtual machine from the source physical machine to the target physical machine, in response to determining that the incompatible CPU features are in the preset list.

17 Claims, 4 Drawing Sheets

(56) References Cited

OTHER PUBLICATIONS

"VMotion CPU compatibility requirements for the Intel processors (1991)," last updated Jun. 15, 2016, URL=https://kb.vmware.com/s/article/1991, download date May 14, 2018, 4 pages.

* cited by examiner

METHOD AND APPARATUS FOR LIVE-MIGRATING VIRTUAL MACHINES

CROSS-REFERENCE TO RELATED APPLICATION

This application claims the priority of Chinese Patent Application No. 201610812046.2, entitled "Method and Apparatus for Live-Migrating Virtual Machines," filed on Sep. 9, 2016, the content of which is incorporated herein by reference in its entirety.

TECHNICAL FIELD

The present application relates to the field of computer technology, specifically to the field of Internet technology, and more specifically to the method and apparatus for live-migrating virtual machines.

BACKGROUND

For cloud computing, particularly products that provide virtual machine services, as the scale of physical machines continuously increases, different batches of physical machines will be purchased, and there will be multiple physical machine models in a same cluster. During virtualization implementation, the virtualization of the memory and magnetic disks is not greatly affected by physical machines; however, in the case of different types of central processing units (CPUs), when a virtual machine needs to be live-migrated across physical machines (that is, saving/restoring the virtual machine, generally referring to the running state of the entire virtual machine being completely saved, and being quickly restored on the original hardware platform or on a different hardware platform; after restoration, the virtual machine still run smoothly, without the user perceiving any difference), there is a problem of instruction set incompatibility, which is also an important problem to be solved for live-migrating virtual machines in a heterogeneous cluster.

There are mainly two solutions to the problems of CPU model consistency, performance, and live migration compatibility of a large-scale cluster:
1) Ensure that the cluster uses same processors, and a guest machine (that is, virtual machine) adopts a host model (host_model) or host passthrough model as its CPU model (CPU_model).
2) Use a custom model (custom) that is supported by all physical machines in the cluster.

The first solution is to ensure the performance and compatibility features by means of hardware consistency; while the second solution takes into consideration the requirements of highly heterogeneous clusters, and causes a greater performance loss.

SUMMARY

An objective of the present application is to provide a method and apparatus for live-migrating virtual machines, so as to solve the technical problems mentioned in the Background section.

According to a first aspect, the present application provides a method for live-migrating virtual machines, the method comprising: acquiring, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features; determining whether the CPU instruction set architecture of the source physical machine is compatible with the CPU instruction set architecture of the target physical machine; determining whether the CPU features of the source physical machine are compatible with the CPU features of the target physical machine, in response to determining the CPU instruction set architecture of the source physical machine being compatible with the CPU instruction set architecture of the target physical machine; determining whether incompatible CPU features between the source physical machine and the target physical machine are in a preset list, in response to determining the CPU features of the source physical machine being not compatible with the CPU features of the target physical machine; and live-migrating the virtual machine from the source physical machine to the target physical machine, in response to determining that the incompatible CPU features are in the preset list.

In some embodiments, the method comprises generating the preset list, comprising: acquiring the CPU information of each physical machine CPU in a cluster computing system; assigning physical machine CPUs having compatible CPU instruction set architectures and incompatible CPU features, as a candidate physical machine CPU set; and adding the incompatible CPU features between the physical machine CPUs in the candidate physical machine CPU set to a list.

In some embodiments, the method further comprises: performing CPU information encoding for the incompatible CPU features in the list.

In some embodiments, the method further comprises: disabling the incompatible CPU features in the list.

In some embodiments, the acquiring the CPU information of the source physical machine and CPU information of the target physical machine comprises: passing different instruction parameters using a CPU compilation instruction, to acquire the CPU information of the source physical machine and the CPU information of the target physical machine.

In some embodiments, the virtual machine adopts a host model.

In some embodiments, the method further comprises generating a compatible CPU model, comprising: acquiring the CPU information of each physical machine CPU in a cluster computing system; and combining compatible CPU instruction set architectures and compatible CPU features between the physical machine CPUs to form a compatible CPU model for use by each virtual machine.

According to a second aspect, the present application provides an apparatus for live-migrating virtual machines, the apparatus comprising: an acquiring unit, configured to acquire, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features; a detection unit, configured to determine whether the CPU instruction set architecture of the source physical machine is compatible with the CPU instruction set architecture of the target physical machine; and determine whether the CPU features of the source physical machine are compatible with the CPU features of the target physical machine, in response to determining the CPU instruction set architecture of the source physical machine being compatible with the CPU instruction set architecture of the target physical machine; a query unit, configured to determine whether incompatible CPU features between the source physical machine and the target physical machine are in a preset list, in response to determining the CPU features of the source physical machine being not compatible with the CPU features of the target physical machine; and a control unit, configured to live-migrate the virtual machine from the source physical machine to the target physical machine, in response to determining that the incompatible CPU features are in the preset list.

In some embodiments, the apparatus further comprises a list generation unit, configured to: acquire CPU information of each physical machine CPU in a cluster computing system; use physical machine CPUs, of which the CPU instruction set architectures are compatible but the CPU features are not compatible, as a candidate physical machine CPU set; and add the incompatible CPU features between the physical machine CPUs in the candidate physical machine CPU set to a list.

In some embodiments, the apparatus further comprises an encoding unit, configured to: perform CPU information encoding for the incompatible CPU features in the list.

In some embodiments, the control unit is further configured to: disable the incompatible CPU features in the list.

In some embodiments, the acquiring unit is further configured to: pass different instruction parameters using a CPU compilation instruction, to acquire the CPU information of the source physical machine and the CPU information of the target physical machine.

In some embodiments, the virtual machine adopts a host model.

In some embodiments, the apparatus further comprises a model generation unit, configured to: acquire CPU information of each physical machine CPU in a cluster computing system; and combine compatible CPU instruction set architectures and compatible CPU features between the physical machine CPUs to form a compatible CPU model for use by each virtual machine.

The method and apparatus for live-migrating virtual machines that are provided by the present application, by ensuring that a virtual machine can be live-migrated when a CPU instruction set architecture of a source physical machine is compatible with a CPU instruction set architecture of a target physical machine and incompatible CPU features between the source physical machine and the target physical machine are in a preset list, solve the problem that a virtual machine cannot be live-migrated across physical machines due to different CPU models, and do not need to sacrifice too much CUP performance of physical machines in exchange for compatibility.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
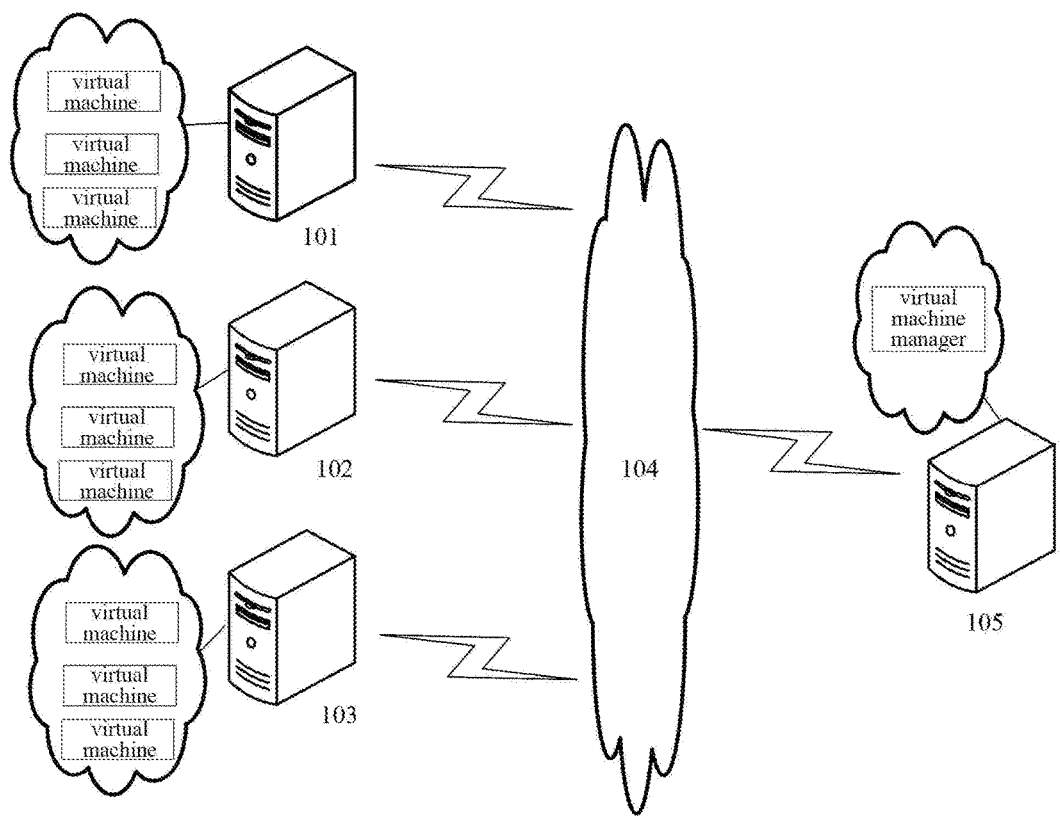
FIG. 1 is a diagram illustrating an exemplary system architecture to which the present application can be applied.

FIG. 1 shows an exemplary system architecture 100 to which an method for live-migrating virtual machines or an apparatus for live-migrating virtual machines according to an embodiment of the present application can be applied.

As shown in FIG. 1, the system architecture 100 may include physical machines (where the physical machine is the name of a physical computer relative to a virtual machine, and the physical machine provides a hardware environment for the virtual machine and is sometimes referred to as a "host") 101, 102, and 103, a network 104, and a server 105. The network 104 is a medium for providing a communication link between the physical machines 101, 102, and 103 and the server 105. The network 104 may include various connection types, such as wired and wireless communication links or optical fiber cables.

A user may use the physical machines 101, 102, and 103 to interact with the server 105 through the network 104 to receive or send a message or the like. The physical machines 101, 102, and 103 may have a virtual machine installed thereon and receive a virtual machine scheduling instruction from the server 105. A virtual machine (VM) is a software-simulated complete computer system having complete hardware system functions and running in a completely isolated environment. An existing physical machine on which a virtual machine resides is generally divided into three layers. The first layer is hardware carrying the system of the virtual machine, and a CPU where the virtual machine is located is at this layer. The second layer is a virtual machine manager (VMM) built on the hardware and used for managing the virtual machine. The third layer is the virtual machine itself, including a virtual CPU and a virtual memory of the virtual machine.

The physical machines 101, 102, and 103 may each be a tablet computer, a portable laptop computer, a desktop computer or the like having a virtual machine installed thereon. The physical machine provides a hardware environment for the virtual machine and is sometimes referred to as a "host". By means of the cooperation of the physical machine and the virtual machine, multiple operating systems (one external operating system and multiple operating systems in the virtual machine) may be installed on one computer, and the operating systems also can communicate with each other, as if there are multiple computers.

The server 105 may be a server providing various services, for example, a virtual machine management server for providing a management function for the virtual machines running on the physical machines 101, 102, and 103. The virtual machine management server may periodically monitor the resource utilization rate of the physical machines and the virtual machines, and adjust the distribution of the virtual machines on the physical machines by means of live migration according to the resource distribution. Live migration, that is, saving/restoring a virtual machine, generally refers to that the running state of the entire virtual machine is completely saved, and can be quickly restored on the original hardware platform or on a different hardware platform; after restoration, the virtual machine can still run smoothly, and the user will perceive no difference.

It should be noted that the method for live-migrating virtual machines that is provided in this embodiment of the present application is generally executed by the server 105. Correspondingly, the apparatus for live-migrating virtual machines is generally disposed in the server 105.

It should be appreciated that the number of physical machines, networks, and servers in FIG. 1 are merely exemplary. Any number of physical machines, networks, and servers may be set according to implementation requirements.

Figure 2:
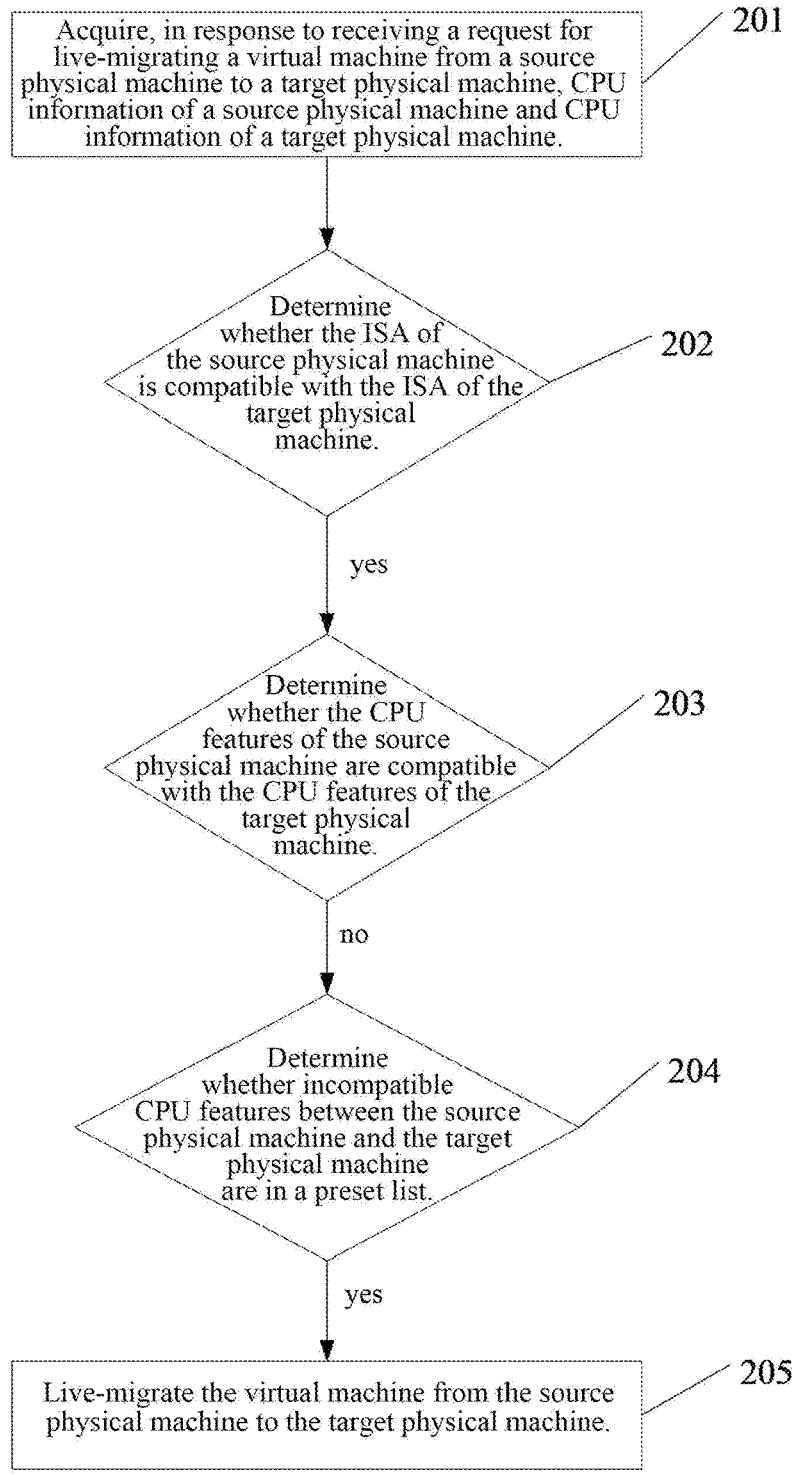
FIG. 2 is a flow chart of a method for live-migrating virtual machines according to an embodiment of the present application.

Further, referring to FIG. 2, FIG. 2 shows a flow 200 of a method for live-migrating virtual machines according to an embodiment of the present application. The method for live-migrating virtual machines includes the following steps:

Step 201. Acquire, in response to receiving a request for live-migrating a virtual machine from a source physical machine to a target physical machine, CPU information of a source physical machine and CPU information of a target physical machine.

Using a currently mainstream cloud computing product implementation framework openstack (virtual machine management component)+libvirt (virtualization management component)+driver (qemu-kvm) (driver component) as an example, the virtual CPU model (vCPU_model) finally presented to the user is the results of different levels of processing performed by the three components. Live migration is the migration of the whole system state. Live migration can be performed between CPUs only when features supported by the CPUs and the states of registers in the CPUs are both equivalent. During migration, information of the CPUs, including vendor and family, is compared. Therefore, generally in virtual machine management logic, it is not allowed to perform live migration between physical machine CPUs of different models.

In this embodiment, an electronic device (for example, the server shown in FIG. 1) on which the method for live-migrating virtual machines is run may receive a live migration request from a physical machine by means of wired connection or wireless connection, the live migration request including a target physical machine to be migrated to. Before a live migration operation is executed, the compatibility between the source physical machine CPU and the target physical machine CPU needs to be detected by using CPU information. The CPU information includes a CPU instruction set architecture (ISA) and CPU features. Common types of ISAs are as follows: Complex Instruction Set Computing (CISC); Reduced Instruction Set Computing (RISC); Explicitly Parallel Instruction Computing (EPIC); Very-Long Instruction Word (VLIW). The CPU features are extended special instructions different from the basic ISA, for example, special hardware instructions in such fields as vector computing, security and multimedia.

In some optional implementations of this embodiment, passing different instruction parameters using a CPU compilation instruction, to acquire the CPU information of the source physical machine and the CPU information of the target physical machine. For example, the CPU information is acquired by using a CPUID instruction. The CPUID instruction is a compilation instruction for obtaining CPU information under an Intel IA32 architecture. By using the CPUID instruction, CPU-related information such as the type, model, vendor information, trademark information, serial number, and buffer of the CPU can be obtained. CPUID uses eax as an input parameter, and uses eax, ebx, ecx, and edx as output parameter. By using eax=0 as the input parameter, the vendor information of the CPU can be obtained. After the CPUID instruction is executed, a piece of 12-character vendor information is returned, in which the first four characters forming an ASC code are placed in ebx from low-order to high-order, the four characters in the middle are placed in edx, and the last four characters are placed in ecx. For example, for an Intel CPU, a character string "GenuineIntel" is returned. The returned value is stored in the following format:

31 23 15 07 00
EBX|u (75)|n (6E)|e (65)|G (47)
EDX|I (49)|e (65)|n (6E)|i (69)
ECX|l (6C)|e (65)|t (74)|n (6E)

The features of the CPU can be obtained by using the CPUID, with the parameter being eax=1 and the returned value being placed in edx and ecx. It can be determined, by checking one bit in edx or ecx, whether a feature of the CPU is supported. For example, bit 32 in edx indicates whether MMX is supported, bit 28 in edx indicates whether Hyper-Threading is supported, and bit 7 in ecx indicates whether speed sted is supported.

In some optional implementations of this embodiment, the virtual machine in the cluster computing system adopts a host model (host_model). Since the development speed of virtual driver components are far lower than the product upgrade speed of CPU vendors, the processing principle of the virtualization management component is to find, in CPU models supported by the driver, the best CPU model that has the highest coincidence degree with the function set of the current physical machine CPU.

In the prior art, to ensure the compatibility during the migration of virtual machines between different hosts, the virtualization management component (for example, libvirt) provides three CPU models (CPU_model):

a) Custom model (custom): A particular CPU model is specified for the virtual machine. This model needs to be supported by the current virtualization management component and needs to fall within the range that can be supported by the actual capability of the current physical machine CPU.

b) Host model (host_model): No specific CPU model is specified. Specifically, the virtualization management component is used to determine a CPU model that is closest to the physical machine (host) CPU.

c) Host passthrough model (host_passthrough): The physical machine (host) CPU is passed straight through to the virtual machine (guest).

The custom model has the best compatibility. Since the CPU models are consistent in the cluster, the best migration compatibility is provided. However, because the computing power of all the physical CPUs needs to be taken into consideration for selecting a specific CPU model, the performance is greatly limited, leading to low performance.

The host passthrough model has the best performance, and presents the best computing power of the physical machine CPU to the virtual machine.

The host model is a compromise between performance and compatibility, and specifically needs to be processed by the virtualization management component.

Step 202. Determine whether the ISA of the source physical machine is compatible with the ISA of the target physical machine.

In this embodiment, based on the CPU information of the source physical machine and the CPU information of the target physical machine that are obtained at step 201, the above-mentioned electronic device (for example, the server shown in FIG. 1) determines whether the ISA of the source physical machine is compatible with the ISA of the target physical machine. If the ISA of the source physical machine is not compatible with the ISA of the target physical machine, live migration cannot be performed. If the ISA of the source physical machine is compatible with the ISA of the target physical machine, a further judgment is made.

Step 203. Determine whether the CPU features of the source physical machine are compatible with the CPU features of the target physical machine.

In this embodiment, if it is determined at step 202 that the ISA of the source physical machine is compatible with the ISA of the target physical machine, it is further determined whether the CPU features of the source physical machine are compatible with the CPU features of the target physical machine.

Step 204. Determine whether incompatible CPU features between the source physical machine and the target physical machine are in a preset list.

In this embodiment, if it is determined at step 203 that the CPU features of the source physical machine are not compatible with the CPU features of the target physical machine, it needs to be further determined whether incompatible CPU features between the source physical machine and the target physical machine are in a preset list. The preset list contains a preset CPU feature set. If the incompatible CPU features are in the list, it indicates that the incompatible CPU features are known and can be tolerated. In this case, it may be considered that a virtual machine model on the source physical machine is consistent with that on the target physical machine, and a subsequent operation can be performed. If the incompatible CPU features are not in the list, live migration to the target physical machine cannot be performed. If it is determined at step 203 that the CPU features of the source physical machine are compatible with the CPU features of the target physical machine, that is, both the ISA and the CPU features of the source physical machine are compatible with those of the target physical machine, it may be considered that the virtual machine model on the source physical machine is consistent with that on the target physical machine, and a subsequent operation can be performed.

In some optional implementations of this embodiment, the method further includes generating a compatible CPU model, including: acquiring the CPU information of each physical machine CPU in a cluster computing system; and combining compatible CPU instruction set architectures and compatible CPU features between the physical machine CPUs to form a compatible CPU model for use by each virtual machine. The compatible CPU model is mainly for the purpose of covering all information of a virtual machine CPU model, mainly including two parts: basic ISA information and enhanced features, as shown in Table 1:

TABLE 1

| | Information | Description |
|---|---|---|
| Basic ISA | vendor | vendor identification information, such as GenuineIntel and AuthenticAMD |
| | family | basic version code of CPU model |
| | CPUID level | main revised version code of CPU model |
| | model level | revised version sub-code of CPU model |
| Enhanced features | enhancement with special instructions | Including enhancement with special hardware instructions in such fields as vector computing, security and multimedia |

Step 205. Live-migrate the virtual machine from the source physical machine to the target physical machine.

In this embodiment, when it is determined at step 204 that the incompatible CPU features between the source physical machine and the target physical machine are in the preset list, the virtual machine may be live-migrated from the source physical machine to the target physical machine. That is, a virtual machine running on the source physical machine is saved; then the virtual machine is restored on the target physical machine. Generally, the running state of the entire virtual machine is completely saved, and can be quickly restored on a different hardware platform; after restoration, the virtual machine can still run smoothly, and the user will perceive no difference.

According to the method provided in the above-mentioned embodiment of the present application, a filtering operation is performed on CPU incompatibility caused by CPU features, and the CPU features in the preset list are considered to be compatible, so that virtual machines that can be live-migrated are no longer limited to those in a same physical CPU model, thereby sacrificing as less performance as possible in exchange for compatibility.

Figure 3:
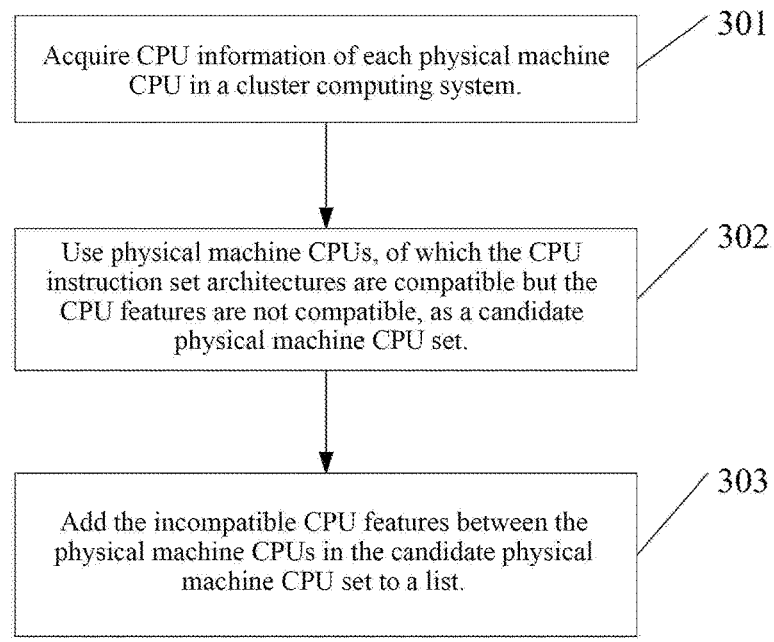
FIG. 3 is a flow chart of a method for live-migrating virtual machines according to another embodiment of the present application.

Further, referring to FIG. 3, FIG. 3 shows a flow 300 of a method for live-migrating virtual machines according to another embodiment. The flow 300 of the method for live-migrating virtual machines includes the following steps:

Step 301. Acquire CPU information of each physical machine CPU in a cluster computing system.

In this embodiment, an electronic device (for example, the server shown in FIG. 1) on which the method for live-migrating virtual machines is run may acquire CPU information of each physical machine CPU in a cluster computing system by means of wired connection or wireless connection. The CPU information includes a CPU instruction set architecture and CPU features. The cluster computing system connects together multiple physical machines by means of a fast communication link. From the perspective of the outside, the physical machines operate like one physical machine; from the perspective of the inside, an external load is dynamically distributed to the node machines by means of a particular mechanism, thereby achieving high performance and high availability of a super server. By means of the cooperation of the physical machine and the virtual machine, multiple operating systems (one external operating system and multiple operating systems in the virtual machine) may be installed on one physical machine (computer), and the operating systems also can communicate with each other, as if there are multiple computers.

Step 302. Use physical machine CPUs, of which the CPU instruction set architectures are compatible but the CPU features are not compatible, as a candidate physical machine CPU set.

In this embodiment, although strict consistency of physical machine CPUs cannot be ensured during construction of the cluster computing system, the use of CPU types having greatly different basic architectures is basically avoided. Therefore, the difference between different physical machine CPUs mainly lies in the revision sub-code and CPU features. Since the revision version sub-code usually directly reflect the difference in CPU features, consistency of basic ISAs can basically be ensured. Physical machine CPUs of which ISAs are compatible but CPU features are not compatible are selected from multiple physical machines as candidate physical machine CPUs. Live-migrating virtual machines can be performed between the candidate physical machine CPUs, but cannot be performed between physical machine CPUs of which ISAs are not compatible.

In some optional implementations of this embodiment, CPU information encoding is performed for the incompatible CPU features. For example, for the CPU model E5-2620 (V1, V2, and V3), the features in Table 2 cannot be supported at the same time, and therefore the CPU information (that is, CPUID) is encoded.

TABLE 2

| | Name | Description | Code |
|---|---|---|---|
| 1 | fma | 128 bit/256 bit stream Extension | function = '0x00000001' ecx = '0x00001000' |
| 2 | movbe | Move Data After Swapping Bytes instruction | function = '0x00000001' ecx = '0x00400000' |
| 3 | abm | Advanced Bit Manipulation Extension | function = '0x80000001' ecx = '0x00000020' |
| 4 | bmi1 | Bit Manipulation Extension set-1 | function = '0x00000007' ebx = '0x00000008' |
| 5 | avx2 | Advanced Vector Extension | function = '0x00000007' ebx = '0x00000020' |
| 6 | bmi2 | Bit Manipulation Extension set-2 | function = '0x00000007' ebx = '0x00000100' |
| 7 | invpcid | Invlid Process Context Identifier | function = '0x00000007' ebx = '0x00000400' |

Step 303. Add the incompatible CPU features between the physical machine CPUs in the candidate physical machine CPU set to a list.

In this embodiment, based on the candidate physical machine CPU set obtained at step 302, incompatible CPU features between CPUs in the set are added to the list. Content recorded in the list is compatible CPU features between multiple physical machine CPUs. In one cluster computing system, multiple physical machines may be divided into multiple groups, for example, an AMD group and an Intel group, and a compatible CPU feature list is established for the AMD group and the Intel group respectively. When a new physical machine is added to the cluster computing system, the new physical machine is classified into one group according to CPU information of the new physical machine, and the compatible CPU feature list is updated.

In some optional implementations of this embodiment, the incompatible CPU features in the generated list are disabled, so as to avoid migration failure caused by incompatibility of CPU features when live migration across physical machines is performed.

The method provided in the above-mentioned embodiment of the present application, by setting a compatible CPU feature list to shield the bottom layer differences, improves the success rate of live-migrating virtual machines while ensuring the system performance.

Figure 4:
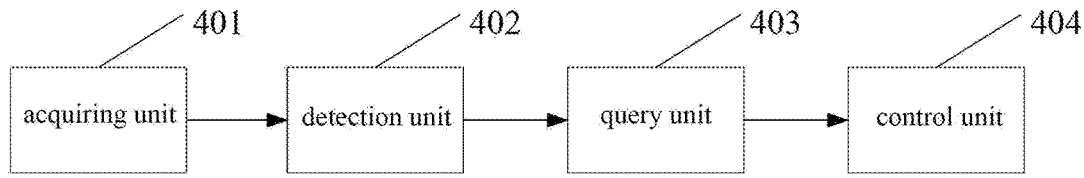
FIG. 4 is a schematic structural diagram of an apparatus for live-migrating virtual machines according to an embodiment of the present application.

Further, referring to FIG. 4, as an implementation of the methods shown in the above-mentioned figures, the present application provides an embodiment of an apparatus for live-migrating virtual machines. This apparatus embodiment corresponds to the method embodiment shown in FIG. 2. The apparatus may be specifically applied to various electronic devices.

As shown in FIG. 4, the apparatus 400 for live-migrating virtual machines according to this embodiment includes: an acquiring unit 401, a detection unit 402, a query unit 403, and a control unit 404. The acquiring unit 401 is configured to acquire, in response to receiving a request for live-migrating a virtual machine from a source physical machine to a target physical machine, central processing unit (CPU) information of the source physical machine and CPU information of the target physical machine, wherein the CPU information includes a CPU instruction set architecture and CPU features. The detection unit 402 is configured to determine whether the CPU instruction set architecture of the source physical machine is compatible with the CPU instruction set architecture of the target physical machine; and further determine whether the CPU features of the source physical machine are compatible with the CPU features of the target physical machine, in response to determining the CPU instruction set architecture of the source physical machine being compatible with the CPU instruction set architecture of the target physical machine. The query unit 403 is configured to further determine whether incompatible CPU features between the source physical machine and the target physical machine are in a preset list, in response to determining that the CPU features of the source physical machine are not compatible with the CPU features of the target physical machine. The control unit 404 is configured to live-migrate the virtual machine from the source physical machine to the target physical machine, in response to determining that the incompatible CPU features are in the preset list.

In this embodiment, the acquiring unit 401 acquires the CPU information of the source physical machine and the target physical machine, so that the detection unit 402 determines, according to the CPU information, whether the ISA of the source physical machine is compatible with the ISA of the target physical machine but the CPU features of the source physical machine are not compatible with the CPU features of the target physical machine. When the ISA of the source physical machine is compatible with the ISA of the target physical machine but the CPU features of the source physical machine are not compatible with the CPU features of the target physical machine, the query unit 403 queries whether the incompatible CPU features are in the preset list. When the incompatible CPU features are in the preset list, the control unit 404 live-migrates the virtual machine from the source physical machine to the target physical machine.

In some optional implementations of this embodiment, the apparatus 400 further includes a list generation unit (not shown), configured to: acquire CPU information of each physical machine CPU in a cluster computing system, wherein the CPU information includes a CPU instruction set architecture and CPU features; use physical machine CPUs, of which the CPU instruction set architectures are compatible but the CPU features are not compatible, as a candidate physical machine CPU set; and add the incompatible CPU features between the physical machine CPUs in the candidate physical machine CPU set to a list.

In some optional implementations of this embodiment, the apparatus 400 further includes an encoding unit (not shown), configured to: perform CPU information encoding for the incompatible CPU features in the list.

In some optional implementations of this embodiment, the control unit 404 is further configured to: disable the incompatible CPU features in the list.

In some optional implementations of this embodiment, the acquiring unit 401 is further configured to: pass different instruction parameters using a CPU compilation instruction, to acquire the CPU information of the source physical machine and the CPU information of the target physical machine.

In some optional implementations of this embodiment, the virtual machine adopts a host model.

In some optional implementations of this embodiment, the apparatus 400 further includes a model generation unit (not shown), configured to: acquiring the CPU information of each physical machine CPU in a cluster computing system, wherein the CPU information includes a CPU instruction set architecture and CPU features; and combining compatible CPU instruction set architectures and compatible CPU features between the physical machine CPUs to form a compatible CPU model for use by each virtual machine.

Figure 5:
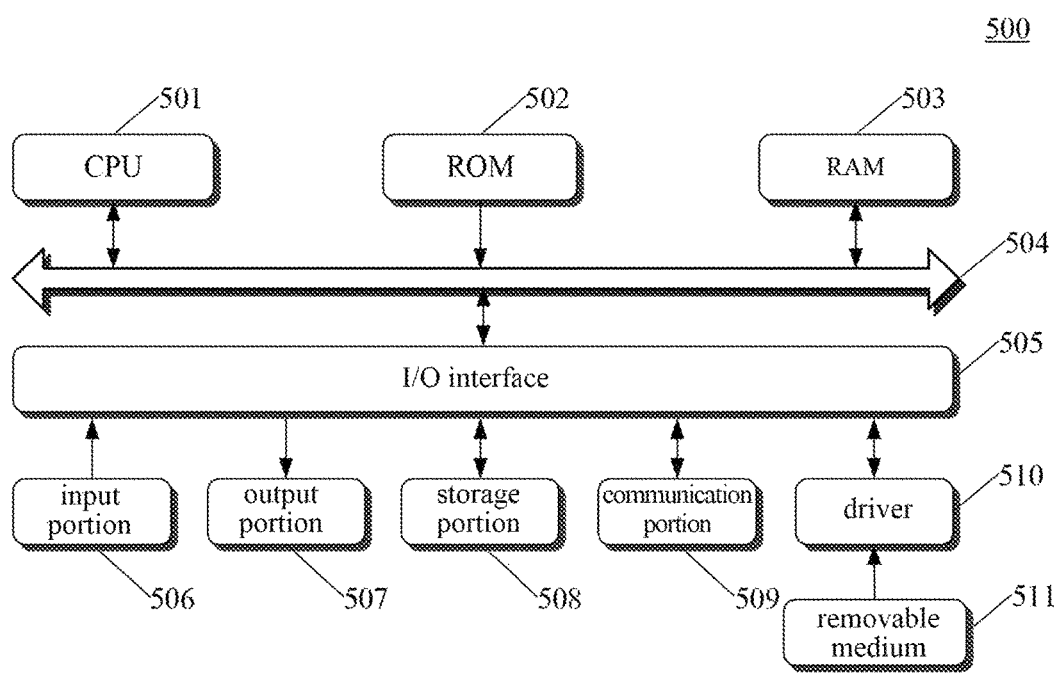
FIG. 5 is a schematic structural diagram adapted to implement a terminal device or a server according to an embodiment of the present application.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units or modules may also be provided in a processor, for example, described as: a processor, comprising an acquiring unit, a detection unit, a query unit and a control unit, where the names of these units or modules are not considered as a limitation to the units or modules. For example, the acquiring unit may also be described as "a unit for acquiring, in response to receiving a request for live-migrating a virtual machine from a source physical machine to a target physical machine, central processing unit (CPU) information of the source physical machine and CPU information of the target physical machine."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features; determine whether the CPU instruction set architecture of the source physical machine is compatible with the CPU instruction set architecture of the target physical machine; determine whether the CPU features of the source physical machine are compatible with the CPU features of the target physical machine, in response to determining the CPU instruction set architecture of the source physical machine being compatible with the CPU instruction set architecture of the target physical machine; determine whether incompatible CPU features between the source physical machine and the target physical machine are in a preset list, in response to determining the CPU features of the source physical machine being not compatible with the CPU features of the target physical machine; and live-migrate the virtual machine from the source physical machine to the target physical machine, in response to determining the incompatible CPU features being in the preset list.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for live-migrating virtual machines, the method comprising:
   acquiring, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features;
   determining whether the CPU instruction set architecture of the source physical machine is compatible with the CPU instruction set architecture of the target physical machine;
   determining whether the CPU features of the source physical machine are compatible with the CPU features of the target physical machine, in response to determining the CPU instruction set architecture of the source physical machine being compatible with the CPU instruction set architecture of the target physical machine;
   determining whether incompatible CPU features between the source physical machine and the target physical machine are in a preset list, in response to determining the CPU features of the source physical machine being not compatible with the CPU features of the target physical machine; and
   live-migrating the virtual machine from the source physical machine to the target physical machine, in response to determining the incompatible CPU features being in the preset list;
   wherein the method further comprises generating the preset list, comprising:
      acquiring the CPU information of each physical machine CPU in a cluster computing system;
      assigning physical machine CPUs having CPU compatible instruction set architectures and incompatible CPU features, as a candidate physical machine CPU set; and
      adding the incompatible CPU features between the physical machine CPUs in the candidate physical machine CPU set to a list.

2. The method for live-migrating virtual machines according to claim 1, further comprising:
   performing CPU information encoding for the incompatible CPU features in the list.

3. The method for live-migrating virtual machines according to claim 1, further comprising:
   disabling the incompatible CPU features in the list.

4. The method for live-migrating virtual machines according to claim 1, wherein the acquiring the CPU information of the source physical machine and CPU information of the target physical machine comprises:
   passing different instruction parameters using a CPU compilation instruction, to acquire the CPU information of the source physical machine and the CPU information of the target physical machine.

5. The method for live-migrating virtual machines according to claim 1, wherein the virtual machine adopts a host model.

6. The method for live-migrating virtual machines according to claim 1, wherein the method further comprises generating a compatible CPU model, comprising:
   acquiring the CPU information of each physical machine CPU in a cluster computing system; and
   combining compatible CPU instruction set architectures and compatible CPU features between the physical machine CPUs to form a compatible CPU model for use by each virtual machine.

7. An apparatus for live-migrating virtual machines, the apparatus comprising:
   at least one processor; and
   a memory storing instructions, which when executed by the at least one processor, cause the at least one processor to perform operations, the operations comprising:
      acquiring, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features;
      determining whether the CPU instruction set architecture of the source physical machine is compatible with the CPU instruction set architecture of the target physical machine; and further determine whether the CPU features of the source physical machine are compatible with the CPU features of the target physical machine, in response to determining the CPU instruction set architecture of the source physical machine being compatible with the CPU instruction set architecture of the target physical machine;
      determining whether incompatible CPU features between the source physical machine and the target physical machine are in a preset list, in response to determining the CPU features of the source physical machine being not compatible with the CPU features of the target physical machine; and
      live-migrating the virtual machine from the source physical machine to the target physical machine, in response to determining the incompatible CPU features being in the preset list;
      wherein the operations further comprise generating the preset list, comprising:
         acquiring CPU information of each physical machine CPU in a cluster computing system;
         assigning physical machine CPUs having compatible CPU instruction set architectures and incompatible CPU features, as a candidate physical machine CPU set; and
         adding the incompatible CPU features between the physical machine CPUs in the candidate physical machine CPU set to a list.

8. The apparatus for live-migrating virtual machines according to claim 7, the operations further comprising:
   performing CPU information encoding for the incompatible CPU features in the list.

9. The apparatus for live-migrating virtual machines according to claim 7, the operations further comprising:
   disabling the incompatible CPU features in the list.

10. The apparatus for live-migrating virtual machines according to claim 7, wherein the acquiring the CPU information of the source physical machine and CPU information of the target physical machine comprises:

passing different instruction parameters using a CPU compilation instruction, to acquire the CPU information of the source physical machine and the CPU information of the target physical machine.

11. The apparatus for live-migrating virtual machines according to claim 7, wherein the virtual machine adopts a host model.

12. The apparatus for live-migrating virtual machines according to claim 7, wherein the operations further comprise generating a compatible CPU model, comprising:

acquire CPU information of each physical machine CPU in a cluster computing system, wherein the CPU information comprises a CPU instruction set architecture and CPU features; and combine compatible CPU instruction set architectures and compatible CPU features between the physical machine CPUs to form a compatible CPU model for use by each virtual machine.

13. A non-transitory computer storage medium storing a computer program, which when executed by one or more processors, cause the one or more processors to perform operations, the operations comprising:

acquiring, in response to receiving a request for live-migrating a virtual machine from a source physical machine to a target physical machine, central processing unit (CPU) information of the source physical machine and CPU information of the target physical machine, the CPU information comprising a CPU instruction set architecture and CPU features;

determining whether the CPU instruction set architecture of the source physical machine is compatible with the CPU instruction set architecture of the target physical machine;

determining whether the CPU features of the source physical machine are compatible with the CPU features of the target physical machine, in response to determining the CPU instruction set architecture of the source physical machine being compatible with the CPU instruction set architecture of the target physical machine;

determining whether incompatible CPU features between the source physical machine and the target physical machine are in a preset list, in response to determining the CPU features of the source physical machine being not compatible with the CPU features of the target physical machine; and live-migrating the virtual machine from the source physical machine to the target physical machine, in response to determining the incompatible CPU features being in the preset list;

wherein the operations further comprise generating the preset list, comprising:

acquiring CPU information of each physical machine CPU in a cluster computing system;

assigning physical machine CPUs having compatible CPU instruction set architectures and incompatible CPU features, as a candidate physical machine CPU set; and adding the incompatible CPU features between the physical machine CPUs in the candidate physical machine CPU set to a list.

14. The non-transitory computer storage medium according to claim 13, the operations further comprising:

performing CPU information encoding for the incompatible CPU features in the list.

15. The non-transitory computer storage medium according to claim 13, the operations further comprising:

disabling the incompatible CPU features in the list.

16. The non-transitory computer storage medium according to claim 13, wherein the acquiring the CPU information of the source physical machine and CPU information of the target physical machine comprises:

passing different instruction parameters using a CPU compilation instruction, to acquire the CPU information of the source physical machine and the CPU information of the target physical machine.

17. The non-transitory computer storage medium according to claim 13, wherein the operations further comprise generating a compatible CPU model, comprising:

acquiring the CPU information of each physical machine CPU in a cluster computing system; and combining compatible CPU instruction set architectures and compatible CPU features between the physical machine CPUs to form a compatible CPU model for use by each virtual machine.

* * * * *